United States Patent Office 3,259,500
Patented July 5, 1966

---

3,259,500
METHOD FOR INHIBITING ANEMIA IN YOUNG PIGS BY FEEDING THE SOW AN IRON AGENT
Charles E. Barnhart and Charles H. Chaney, Lexington, Ky., assignors, by mesne assignments, to The Kentucky Research Foundation, Lexington, Ky., a corporation of Kentucky
No Drawing. Filed Oct. 11, 1961, Ser. No. 144,289
4 Claims. (Cl. 99—2)

The present application is a continuation-in-part of our copending application, Serial No. 70,432, filed November 21, 1960, now abandoned, entitled, Method for Inhibiting Anemia in Swine and Hematinic Feedstuff for Use Therein.

It has long been known that newly born pigs are farrowed with only a limited supply of iron in their bodies and that an additional supply of this element must be furnished to the pigs during the early period of their life in order to inhibit anemia. Hemoglobin and hematocrit values are the recognized means for diagnosing anemia or the approach of anemia in a pig. In general, for pigs permitted to root naturally in the soil the hemoglobin values for pigs of 1 to 2 hours of age are about 11.8 and for pigs of 1 to 10 days of age about 8.1. Normal pigs may have a hemoglobin value of about 10.0 at age of 1 day, dropping to about 7.5 at age of 8 days and rising to about 8.2 at age of 15 days. All hemoglobin values herein expressed represent the number of grams of hemoglobin per 100 ml. of blood. It also has been reported that if pigs, which are confined in concrete pens out of contact with the soil, do not receive supplemental iron during their early age, anemia will develop in about 2 to 3 weeks after farrowing and that the hemoglobin values will decrease to about 2.0 to 3.0 in about 3 to 4 weeks after farrowing. It is a purpose of the present invention to reduce the degree of maximum severity of and length of this period of iron-deficiency in the blood of young pigs, if not to eliminate such period entirely.

So far as we are aware, authorities in this field have consistently taught that no satisfactory solution to this problem can be expected from feeding comparatively massive amounts of iron compounds to the sow during the lactation period, or during its gestation period, or during both such periods. For example, in Publication 295, August 1953, Nutrient Requirements for Swine, National Academy of Sciences—National Research Council, it is stated at page 5 that feeding iron and/or copper salts to pregnant or lactating sows has not been directly effective in preventing anemia in suckling pigs because these minerals are not secreted in the sow's milk in sufficient amount to prevent anemia. Also on page 6 it is recommended that 15 mg. of iron per pound of total diet represents a satisfactory operating allowance for swine in order to permit normal growth and reproduction.

Moreover, it is authoritatively stated (Dunne et al., Diseases of Swine, page 634, published by Iowa State College Press, Ames, Iowa, 1958) that the feeding of iron and copper to sows during gestation is not effective in increasing reserves of these elements in newly born pigs and that iron in rations in excess of normal recommendations serves no useful purpose and may actually form a complex insoluble salt with calcium and cause rickets in the pigs.

We have found that when the sow is fed a ration prior to farrowing, which is not enriched in iron, its colostric milk will have a peak value of iron content which markedly diminishes in the milk after a period of about five days following farrowing. When the pigs have access to iron supplies in the soil, for example, this rapid diminution of the iron content in the sow's milk may not be serious, but when the pigs are confined in concrete or wooden pens without contact with the soil, a supplementary source of iron must be provided if the danger of anemia is to be avoided.

Surprisingly, we have discovered that when the sow is fed a ration enriched in certain specified iron compounds and in comparatively massive amounts, for about two weeks prior to farrowing and for at least two weeks immediately subsequent to farrowing, the iron content in its milk available for building the pig's blood remains at a comparatively high level, and that no supplementary source of iron for the pigs is necessary, no development of rickets takes place in the pigs, and no adverse effects are suffered by the sow.

The same phenomenon is observed when the iron-enriched ration is fed to a sow beginning at farrowing and continuing for three weeks after farrowing.

In addition, we have discovered that although certain iron compounds give a significant response in increasing the hemoglobin and hematocrit values of the pig's blood, other iron compounds which have previously been used in treatment of anemia in animals fail to give a satisfactory response and still other hematinic iron compounds give a response which, while slightly noticeable, is unsatisfactory in lending utility to the feeding practice.

The reason for these distinctions between the different iron agents is not now known and does not appear to be governed by the relative solubilities or other common physical characteristics of iron compounds as found in the chemical literature.

Our method of inhibiting anemia may be used solely as herein taught, or in conjunction with presently known methods, without departing from our invention. For example, commonly accepted methods at present comprise the placing of clean sod in the pen for pigs daily; or the swabbing of the sow's udder with iron sulfate daily; or the oral feeding of the pigs with iron pills or liquid preparations at certain prescribed intervals; or the injection of the pigs with iron dextran or equivalent preparations at a few days of age and possibly again at approximately two weeks of age. These known methods, although apparently effective in inhibiting anemia in the pig, each requires considerable labor expense, and in some cases entail a considerable expense for materials.

In contrast, the present method, when the massive iron content is commensurate with palatability of the feedstuff, results in the self-administration of the hematinic agent by the swine.

An object of our invention, therefore, is to provide a new and useful method of increasing the iron content in the milk of a lactating sow by feeding to the sow a palatable ration including a hematinic iron agent in comparatively massive amounts as contrasted with conventional rations.

Another object is to provide a method for inhibiting anemia in pigs by feeding the pig a sow's milk having an iron content greater than that obtainable in the sow's milk by feeding the sow a conventional ration.

Another object is to provide a method for increasing the hemoglobin value of a pig's blood by feeding to the pig a starter ration containing a hematinic iron agent in comparatively massive amounts.

Another object is to provide an improved and palatable feedstuff for swine.

A further object is to provide a readily mixable concentrate or premix containing massive amounts of an iron agent and suitable upon dilution with energy-yielding and protein materials to form a palatable hematinic feedstuff for swine.

Further objects and advantages will appear as the description proceeds, and the invention accordingly comprises the products and methods hereinafter described, the scope of the invention being indicated in the following claims.

The utility of the various iron salts in the treatment of anemia both in man and in domestic animals, has long been known but so far as we are aware, the differences in physiology of man and of the several species of domestic animals prevents any analogy being established between one and another as regards the dosage required, or the particular iron compound which will be effective. This lack of analogy also is accentuated when it is recalled that swine appears to be a unique species of occurs after farrowing of pigs and which nature appears to have provided for by giving pigs an instinct for rooting in soil in order to secure additional iron. As will appear later, the present invention involves the ingestion by the swine of a feedstuff which not only must be palatable, but which must contain an acceptable hematinic iron agent in an amount producing a satisfactory response. The upper limit of the iron agent is dictated largely by the requirement of palatability and the lower limit, which in any event represents a massive dosage by comparison with the above-mentioned National Academy of Sciences publication, is dictated largely by the magnitude of the anemia-inhibiting response desired. However, even within these boundaries some iron-agents, which heretofore have been suggested for use as hematinic agents in man or animal still for reasons not apparent, are unsuitable for use with the present invention. Accordingly, the invention comprehends the use of certain specified iron compounds in an amount providing not more than about 1000 mg. nor less than about 60 mg. of iron content containing agents in the class consisting of Ferrous furmarate
Ferrous lactate
Ferrous gluconate
Ferrous tartrate
Ferric ammonium tartrate (green)
Ferric malate
Ferric citrate
Ferric phosphate (soluble)
Ferric tartrate
Ferric succinate
Ferric potassium tartrate may be satisfactorily employed in carrying out the invention.

The following tabulation specifies the basal ration employed in the several examples which are indicative of the and further distinguishes between the rations used as pig starters, rations used for sows during the gestation period, and rations used for sows during the lactation period. All proportions are by weight and are expressed in pounds per hundred unless otherwise indicated, and the rations are balanced in accordance with recognized animal husbandry practice. For example, principal ration ingredients comprise an energy-yielding material and a protein-containing material, and as used herein such materials are intended respectively to comprise corn or oats; and soybean oil meat, meat and bone scraps and the like.

BASAL RATION

| Ingredient | Example I | | Example II | Example III | | Example IV | | Example V |
|---|---|---|---|---|---|---|---|---|
| | Gestation | Lactation | Lactation | Gestation | Lactation | Gestation | Lactation | |
| Ground Yellow Corn | 48.5 | 59.9 | 59.9 | 48.5 | 59.9 | 48.5 | 59.9 | 28.80 |
| Ground Oats | 25.0 | 20.0 | 20.0 | 25.0 | 20.0 | 25.0 | 20.0 | |
| Soybean Oil Meal | 5.0 | 8.0 | 8.0 | 5.0 | 8.0 | 5.0 | 8.0 | 10.00 |
| Meat and Bone Scraps | 5.0 | 5.0 | 5.0 | 5.0 | 5.0 | 5.0 | 5.0 | |
| Alfalfa Meal | 15.0 | 5.0 | 5.0 | 15.0 | 5.0 | 15.0 | 5.0 | |
| Steamed Bone Meal | 1.0 | 0.5 | 0.5 | 1.0 | 0.5 | 1.0 | 0.5 | |
| Salt | 0.5 | 0.5 | 0.5 | 0.5 | 0.5 | 0.5 | 0.5 | 0.50 |
| Vitamins A and D, gm | 25 | 25 | 25 | 25 | 25 | 25 | 25 | |
| Ground Limestone | | 1.0 | 1.0 | | 1.0 | | 1.0 | 0.50 |
| Aurofac 10 | | 0.1 | 0.1 | | 0.1 | | 0.1 | |
| Trace Minerals Including copper sulfate, gm | 25 | 25 | 25 | 25 | 25 | 25 | 25 | 0.20 |
| | 100.0 | 100.0 | 100.0 | 100.0 | 100.0 | 100.0 | 100.0 | |
| Rolled Oats | | | | | | | | 20.00 |
| Sugar (cane or beet) | | | | | | | | 15.00 |
| Dried Skim Milk | | | | | | | | 20.00 |
| Fish Meal | | | | | | | | 2.50 |
| Dried corn distillers solubles | | | | | | | | 2.50 |
| Vitamin A, I.U | | | | | | | | 200,000 |
| Vitamin D2, I.U | | | | | | | | 62,500 |
| Riboflavin, mg | | | | | | | | 500 |
| Calcium Pantothenate, mg | | | | | | | | 1,000 |
| Niacin, mg | | | | | | | | 2,400 |
| Choline Chloride, mg | | | | | | | | 2,500 |
| Vitamin B12, mcg | | | | | | | | 1,000 |
| Antibiotic, mg | | | | | | | | 1,000 |
| | | | | | | | | 100.00 | per pound of total ration for the swine, such ration to be fed either to the sow for the purpose of increasing the iron content of the sow's, or to the pig in order to maintain the hemoglobin and hematocrit values in the blood of the pig. As will be further apparent, the ration, may, if desired, be fed to any swine at anytime during its life when additional stores of iron in its body is deemed desirable. When all breeds of swine are considered as well their ages, the average preferred ratios of iron to total ration are not less than about 300 mg. nor more than about 600 mg., per pound of total ration. However, for pigs up to an age of about 2–3 weeks the lower limit of 60 mg. per pound of pig starter ration may be used.

Based upon the disclosure to follow each of the iron-

*Example I*

A significant aspect of our invention may be noted from the following Table I relating to the iron content of sow's milk. All sow's were of the Hampshire breed and the control animals were fed the basal gestation and lactations rations respectively, during those periods. The treated animals received the basal gestation ration enriched as indicated in ferrous fumarate continuously for at least two weeks prior to farrowing and then the basal lactation ration enriched in the same amount of ferrous fumarate continuously for at least two weeks after farrowing.

In the determination of the iron content of the milk, the official A.O.A.C. method employing standard techniques of ashing and coloring development, and with usage of standard reagents, was followed.

TABLE I.—IRON CONTENT OF SOW'S MILK

| Time | Sows Fed Basal Ration | | Sows Fed Basal Ration with 600 mg. Fe from Ferrous Fumarate—per pound Total Ration | |
|---|---|---|---|---|
| | Sow | Micrograms Fe/100 ml. milk | Sow | Micrograms Fe/100 ml. milk |
| Day of farrowing | A | 223 | E | 293 |
| | B | 207 | F | 187 |
| | C | 247 | G | 222 |
| | D | 244 | H | 218 |
| | | | I | 251 |
| Average | | 230 | | 234 |
| 5 days after farrowing | A | 256 | E | 208 |
| | B | 211 | F | 122 |
| | C | 229 | G | 248 |
| | D | 157 | H | 234 |
| | | | I | 411 |
| Average | | 213 | | 245 |
| 10 days after farrowing | B | 129 | E | 282 |
| | C | 147 | F | 175 |
| | D | 94 | G | 153 |
| Average | | [1] 123 | | [2] 203 |
| 15 days after farrowing | B | 109 | E | 215 |
| | C | 100 | F | 165 |
| | D | 172 | G | 208 |
| | | | I | 186 |
| Average | | [1] 127 | | [3] 194 |

[1] Milk of sow A not tested.
[2] Milk of sows H and I not tested.
[3] Milk of sow H not tested.

The beneficial results obtained from the pigs suckling a sow whose milk is enriched as indicated by Example I, may be noted from the following Example II showing the comparisons of average hemoglobin and hematocrit values in the blood of those pigs as compared with pigs whose dam received only the basal ration and as compared with pigs all of whose supplemental iron came from conventional iron injection practices, and when the feeding of the sow with the ration having various iron containing agents begins only at the time of farrowing.

In determining these values, conventional techniques were employed. For example, the hemoglobin determination was made by using a photoelectric hemoglobin and glucose meter (Model 15 Photovolt Corporation) wherein a 5 ml. sodium carbonate solution of 0.1 percent concentration is measured into the photoelectric meter glass cell and a 0.02 ml. sample of blood is then pipetted into the sodium carbonate solution. The mixed sample is then placed in the meter and a reading obtained which upon reference to the calibration card of the apparatus provides the hemoglobin value. The hematocrit reading was made by taking a sample of blood into a heparinized capillary tube after which the tub was sealed and centrifuged for 5 minutes at 11,400 r.p.m. The percent blood cell volume was then read rapidly and directly by means of a reader.

*Example II*

The sows were the Hampshire, Berkshire, Yorkshire and Poland China breeds and the pigs and sows were confined in concrete pens during the entire time of the tests. The iron enriched rations contained ingredients shown in the proportions under basal ration and employing the premix mixing procedure hereafter described. The pigs whose dam received only the basal ration had rough hair coats, a generally unthrifty appearance, and were susceptible to scouring. The appearance of the pigs receiving the iron compounds embodying the present invention, however, was noticeably better by contrast with the pigs which received no iron or which received iron from compound not embodied in the present invention and certain of which latter compounds are included in Table II for purposes of comparison.

Of the two sows which received the ration containing ferrous sulfate, for example, one became definitely ill, as indicated by attempts to vomit, extreme nervousness and complete cessation from eating. The other sow, while not exhibiting such striking symptoms, nevertheless showed signs of distress.

In order to investigate any correlation between either reduced iron or iron oxide (both red and brown), as compared with the use of no supplemental iron, and to test, a theory that the acidic gastric juices in the swine's stomach might form an iron salt therefrom and of a type which is found to be satisfactory when fed directly in the ration, a comparable number of pigs were tested, with the result that no significant improvements were noted, as indicated in Table II.

Similar tests to those indicated in Table II were also run on

Ferrous carbonate
Iron oxide (brown)
Albuminized iron
Ferric choline citrate
Ferric ammonium tartrate (brown)

all of which compounds likewise failed to show significant improvements over the use of the basal ration alone.

Similar tests were further run on

Peptonized iron
Ferric carbonate saccharated
Ferric ammonium citrate (brown)
Ferric pyrophosphate (soluble)

all of which compounds showed negligible improvement over the results obtained from using the reduced iron, or the iron oxide (red) as the iron-enriching agent.

All tests in this Example II relate to the practical and economical feeding situation wherein the sows are fed the iron-enriched ration beginning at the time of farrowing and ending three weeks thereafter. By contrast, the practice of the invention as indicated by the following Example III would require that separate iron-enriched gestation and lactation rations be employed, and that the feeding proceed for a total of five weeks.

TABLE II.—IRON AGENTS FED BROOD SOWS STARTING AT FARROWING

| Sow Ration | Number Sows | Number Pigs | Pigs at 15 days | | Pigs at 21 days | |
|---|---|---|---|---|---|---|
| | | | Hemoglobin | Hematocrit | Hemoglobin | Hematocrit |
| | | | | *Percent* | | *Percent* |
| Basal (no iron) | 8 | 64 | 6.3 | 26 | 6.0 | 25 |
| Basal plus 600 mg. Fe/lb. total ration ferrous fumarate | 21 | 169 | 8.1 | 33 | 8.8 | 35 |
| Basal plus 900 mg. Fe/lb. total ration ferrous fumarate | 4 | 33 | 9.2 | 37 | 9.3 | 35 |
| Basal plus 300 mg. Fe/lb. total ration ferrous fumarate | 4 | 32 | 7.4 | 31 | 7.7 | 30 |
| Basal plus 600 mg. Fe/lb. total ration ferric citrate | 2 | 16 | 8.3 | 34 | 8.4 | 33 |
| Basal plus 600 mg. Fe/lb. total ration is ferric phosphate (soluble) | 2 | 16 | 9.1 | 36 | 9.5 | 36 |
| Basal plus 600 mg. Fe/lb. total ration ferric tartrate | 2 | 22 | 8.8 | 35 | 8.7 | 35 |

TABLE II.—Continued

| Sow Ration | Number Sows | Number Pigs | Pigs at 15 days | | Pigs at 21 days | |
|---|---|---|---|---|---|---|
| | | | Hemoglobin | Hematocrit | Hemoglobin | Hematocrit |
| | | | | Percent | | Percent |
| Basal plus 600 mg. Fe/lb. total ration ferric succinate | 2 | 13 | 7.5 | 31 | 8.0 | 33 |
| Basal plus 600 mg. Fe/lb. total ration ferric potassium tartrate | 2 | 18 | 7.3 | 30 | 8.2 | 34 |
| Basal plus 600 mg. Fe/lb. total ration ferrous gluconate | 2 | 11 | 8.7 | 36 | | |
| Basal plus 600 mg. Fe/lb. total ration ferrous lactate | 2 | 12 | 8.5 | 35 | | |
| Basal plus 600 mg. Fe/lb. total ration ferrous sulfate | 2 | 13 | 7.1 | 36 | | |
| Basal plus 600 mg. Fe/lb. total ration ferrous Iron oxide (red) | 7 | 59 | 6.8 | 29 | 6.3 | 29 |
| Basal plus 600 mg. Fe/lb. total ration reduced iron | 9 | 69 | 6.6 | 30 | [1] 6.4 | 30 |
| Basal and iron dextrin injection 100/mg./pig at 3 days | 5 | 37 | 7.3 | 31 | | |
| Basal plus 600 mg. Fe/lb. total ration ferrous tartrate | 2 | 15 | 9.5 | 37 | 9.0 | 36 |
| Basal plus 600 mg. Fe/lb. total ration ferric ammonium tartrate (green) | 2 | 14 | 8.9 | 34 | 8.9 | 37 |
| Basal plus 600 mg. Fe/lb. total ration ferric malate | 2 | 14 | 8.5 | 34 | 8.7 | 36 |

[1] From 57 pigs.

*Example III*

The sows were of the Hampshire breed; the pigs and sows were confined in concrete pens; and the basal ration was the same as in Example II. A variety of iron agents were employed and tests were run on the pigs to an age of 3 weeks. Experience on ferrous fumarate had shown that no substantial improvements were to be secured by feeding the sow with the iron-enriched ration more than two weeks prior to farrowing.

was the same as in Examples II and III. A single iron agent of different concentrations was employed and tests were made of the average hemoglobin and hematocrit values of the pigs' blood beginning at one day of age, then at 8, 15 and 22 days of age, for the pigs whose dams had received the larger iron concentrations. The sows in all cases were fed the respective iron-enriched gestation rations for two weeks prior to farrowing and the iron-enriched lactation for three weeks after farrowing.

TABLE III.—IRON AGENTS FED BROOD SOWS FOR TWO WEEKS BEFORE FARROWING AND FOR THREE WEEKS THEREAFTER

| Sow Ration | Number Sows | Number Pigs | Pigs at 15 days | | Pigs at 21 days | |
|---|---|---|---|---|---|---|
| | | | Hemoglobin | Hematocrit | Hemoglobin | Hematocrit |
| | | | | Percent | | Percent |
| Basal (no iron) | 11 | 88 | 6.2 | 23 | 5.7 | 23 |
| Basal plus 600 mg. Fe/lb. total ration ferrous fumarate | 8 | 68 | 8.6 | 35 | 8.9 | 36 |
| Basal plus 600 mg. Fe/lb. total ration ferric citrate | 2 | 12 | 8.1 | 32 | 9.0 | 33 |
| Basal plus 600 mg. Fe/lb. total ration ferric phosphate (soluble) | 2 | 18 | 8.4 | 34 | 9.9 | 38 |

*Example IV*

The sows were of the Hampshire breed; the pigs and sows were confined in concrete pens; and the basal ration

*Example V*

A pig starter ration was prepared and fed to baby pigs which also were suckling their sows. As a control, sows

TABLE IV.—FERROUS FUMARATE FED AT DIFFERENT LEVELS TO BRED SOWS

| Sow Ration Treatment | Number Sows | Number Pigs | Pigs 1 day of age | | Pigs 8 days of age | | Pigs 15 days of age | | Pigs 22 days of age | |
|---|---|---|---|---|---|---|---|---|---|---|
| | | | Hemoglobin | Hematocrit | Hemoglobin | Hematocrit | Hemoglobin | Hematocrit | Hemoglobin | Hematocrit |
| Basal (No iron) | 3 | 21 | 6.7 | 26 | 5.5 | 26 | 5.9 | 30 | | |
| Basal plus 150 mg. iron per lb. total ration | 4 | 31 | 8.0 | 32 | 7.7 | 30 | 7.3 | 31 | | |
| Basal plus 300 mg. iron per lb. total ration | 5 | 44 | 7.1 | 31 | 7.5 | 31 | 7.9 | 33 | 8.4 | 35 |
| Basal plus 600 mg. iron per lb. total ration | 5 | 37 | 7.2 | 29 | 8.0 | 35 | 8.7 | 36 | 9.0 | 37 | which had been fed the basal ration without iron enrichment were used. The pig starter ration contained the ingredients shown in the proportions under basal ration and employing the concentrate mixing procedure hereafter described. The baby pigs were of the Hampshire breed and both the pigs and sows were confined in concrete pens. Average hemoglobin and hematocrit values were taken at 1, 8 and 15 days of age and comparisons made with pigs receiving iron dextran injections and iron glutonate pills. A lower level of iron agent was employed due to the young age of the pigs. Substantially the same differences in appearance and health between the pigs receiving no iron and those receiving iron as noted in Example II, were also noted in Example V. Reduced iron was tested in order to determine its ability to maintain the values in the pigs' blood, during the second week of a pig's life, when fed in minimum amounts in the starter ration.

In any event, the basic premix requires dilution by the energy-yielding and protein-containing materials of the ration in order to render the final ration fully palatable. It will be understood that the premix normally will be mixed by a feed manufacturer or by the user into the remainder of the total ration in a homogeneous manner, using conventional mixing techniques and apparatus.

The present invention may be practiced without modification of known feeding techniques wherein the use of enzymes, vitamins and the like, are desired. Furthermore, since the ration formulas for sows during gestation are changed after farrowing, and since the ration formulas for young pigs are changed after a certain age, for example, 8 weeks, the use of the present invention will not necessarily require any changes of those normally used formulas.

Essentially, the invention makes it possible to carry the

TABLE V.—SOURCES OF IRON FOR BABY PIGS

| Starter | Number Pigs | Pigs 1 day old | | Pigs 8 days old | | Pigs 15 days old | |
|---|---|---|---|---|---|---|---|
| | | Hemoglobin | Hematocrit | Hemoglobin | Hematocrit | Hemoglobin | Hematocrit |
| Basal (No iron) | 25 | 6.9 | 30 | 6.9 | 29 | 6.0 | 29 |
| Basal plus iron dextran, 100 mg. 3 days and 10 days of age | 25 | 7.7 | 30 | 8.3 | 34 | 9.5 | 34 |
| Basal plus 61.7 mg.Fe per lb. starter reduced iron | 27 | 8.5 | 27 | 8.2 | 29 | 5.9 | 30 |
| Basal plus 61.7 mg.Fe per lb. starter ferrous gluconate | 25 | 7.8 | 29 | 7.2 | 29 | 6.6 | 30 |
| Basal plus 61.7 mg.Fe per lb. starter ferrous fumarate | 26 | 9.4 | 30 | 6.3 | 25 | 6.8 | 30 |
| Basal plus 61.7 mg.Fe per lb. starter ferrous lactate | 37 | 8.6 | 29 | 7.3 | 30 | 6.3 | 28 |
| Basal plus 2 iron gluconate pills per week | 22 | 9.0 | 32 | 7.2 | 34 | 7.8 | 31 |

In accordance with the invention it is desirable, if not essential, that the iron-enriched ration fed as a swine feedstuff, either to the sow or the pig or to a growing hog, have its iron-containing agent dispersed substantially homogeneously with the remainder of the ration. This preferably is accomplished by first providing a uniform concentrate or premix including all of that iron-containing agent and thereafter mixing that concentrate or premix homogeneously with the larger bulk of the total ration thus diluting the iron content of the premix to the ratios herein disclosed, and at the same time changing the acceptability of the feedstuff from an essentially unpalatable premix to a palatable total ration. The specific gravity of the iron-containing agent is appreciably greater than that of any other ingredient of the normal ration and care must be exercised to guard against a later separation of the iron-containing agent from the reminder of the premix prior to preparation of the total ration. We have found that this problem may be solved by thoroughly mixing the required amount of the iron-containing agent, which normally is in a finely divded flowable state of discrete particles with a finely ground carrier material to which the separate particles of that agent will intimately and mechanically adhere, even when both that carrier and that agent are in dry condition. This adherence and homogeneous mixing is best secured when the particles of the carrier and of the agent are of about the same size. In general, such a dry mechanical mixture will retain its homogeneous nature over a long period of time during normal handling and storage, and will also tend to resist caking and hardening when subjected to freezing or to normal amounts of moisture. As one example, the concentrate or premix may comprise a mixture of the iron-containing agent with a portion of the soybean oil meal of the above basal ration and with that meal being specially ground for the purpose. As another example, various inert materials serving as a carrier and without nutritional value to the ration may also be employed and with or without a nutritional ingredient being present. Fuller's earth, inexpensive clay materials and the like may be so used.

young pig through its otherwise drastic iron-deficiency period, and to give it a much improved start in life. Thus, we contemplate that since the danger of anemia is substantially past by the time the young pig is 3 weeks old, provided at that time its blood has a sufficient hemoglobin value, and a sufficient hematocrit value, it will not be necessary generally to practice the invention with respect to the sow after three weeks from the farrowing date nor to practice it with respect to the pig starter ration beyond the first 8 weeks of the pig's life. However, the feedstuff of the invention may, if desired by the owner of the swine, be fed to swine at any time during the swine's life.

Additional ramifications and variations of the invention may be practiced by those skilled in the art and we, therefore, intend by the appended claims to cover all such variations and ramifications as fall within the true spirit and scope of our invention.

What is claimed is:

1. A method for inhibiting anemia in young pigs comprising, increasing the iron content in the milk of a lactating sow by feeding to the sow during its lactation period a ration including an iron agent selected from the group consisting of ferrous fumarate, ferrous lactate, ferrous gluconate, ferrous tartrate, ferric ammonium tartrate (green), ferric malate, ferric citrate, ferric phosphate (soluble), ferric tartrate, ferric succinate and ferric potassium tartrate, said agent being present in an amount providing an iron content of not less than about 60 mg. and not more than about 1000 mg. per pound of total ration, and thereafter feeding said milk to said pigs.

2. The method of claim 1 wherein said iron content is not less than about 300 mg. and not more than about 600 mg. per pound of total ration.

3. A method for inhibiting anemia in young pigs comprising, feeding to a sow for a period beginning at about the time of its farrowing and continuing for at least about three weeks following its farrowing, a ration which increases the iron content in the milk of said sow, said ration including an iron agent selected from the group consisting of ferrous fumerate, ferrous lactate, ferrous gluconate, ferrous tartrate, ferric ammonium tartrate (green), ferric malate, ferric citrate, ferric phosphate (soluble), ferric tartrate, ferric succinate and ferric potassium tartrate, said agent being present in an amount providing an iron content of not less than about 60 mg. and not more than about 1000 mg. per pound of total ration, and feeding said sow's milk to said pigs.

4. A method for inhibiting anemia in young pigs comprising, feeding to a sow for a period of at least about two weeks prior to its farrowing and continuing for a period of at least about three weeks following its farrowing, a ration which increases the iron content in the milk of said sow, said ration including an iron agent selected from the group consisting of ferrous fumerate, ferrous lactate, ferrous gluconate, ferrous tartrate, ferric ammonium tartrate (green), ferric malate, ferric citrate, ferric phosphate (soluble), ferric tartrate, ferric succinate and ferric potassium tartrate, said agent being present in an amount providing an iron content of not less than about 60 mg. and not more than about 1000 mg. per pound of total ration, and feeding said sow's milk to said pigs.

References Cited by the Examiner

UNITED STATES PATENTS

| | | | |
|---|---|---|---|
| 2,848,366 | 8/1958 | Bertsch et al. | 167—68 |
| 2,895,830 | 7/1959 | Roe | 99—2 X |
| 2,926,085 | 2/1960 | Geerlings | 99—21 |
| 2,985,559 | 5/1961 | Coles | 167—68 |

FOREIGN PATENTS

| | | |
|---|---|---|
| 220,534 | 5/1907 | Germany. |

OTHER REFERENCES

Hanson, "A Survey of Haemopoietic Drugs," The Pharmaceutical Journal, May 3, 1958 (p. 331 relied on).

A. LOUIS MONACELL, *Primary Examiner.*

D. DONOVAN, *Assistant Examiner.*